(12) United States Patent
Mitchell et al.

(10) Patent No.: US 12,521,427 B2
(45) Date of Patent: Jan. 13, 2026

(54) MODULATING RENAL LYMPHATICS TO REGULATE BLOOD PRESSURE

(71) Applicant: THE TEXAS A&M UNIVERSITY SYSTEM, College Station, TX (US)

(72) Inventors: Brett Mitchell, Belton, TX (US); Dongin Kim, College Station, TX (US); Mary Nabity, College Station, TX (US); Joseph Rutkowski, College Station, TX (US)

(73) Assignee: THE TEXAS A&M UNIVERSITY SYSTEM, College Station, TX (US)

( * ) Notice: Subject to any disclaimer, the term of this patent is extended or adjusted under 35 U.S.C. 154(b) by 982 days.

(21) Appl. No.: 17/270,796

(22) PCT Filed: Sep. 11, 2019

(86) PCT No.: PCT/US2019/050608
§ 371 (c)(1),
(2) Date: Feb. 23, 2021

(87) PCT Pub. No.: WO2020/055999
PCT Pub. Date: Mar. 19, 2020

(65) Prior Publication Data
US 2021/0330745 A1   Oct. 28, 2021

Related U.S. Application Data

(60) Provisional application No. 62/729,771, filed on Sep. 11, 2018.

(51) Int. Cl.
| | |
|---|---|
| *A61K 38/00* | (2006.01) |
| *A61K 9/51* | (2006.01) |
| *A61K 35/76* | (2015.01) |
| *A61K 38/18* | (2006.01) |
| *A61K 47/42* | (2017.01) |
| *A61P 13/12* | (2006.01) |
| *A61K 48/00* | (2006.01) |

(52) U.S. Cl.
CPC ........ *A61K 38/1866* (2013.01); *A61K 9/5153* (2013.01); *A61K 35/76* (2013.01); *A61K 47/42* (2013.01); *A61P 13/12* (2018.01); *A61K 48/00* (2013.01)

(58) Field of Classification Search
CPC .. A61K 38/1866; A61K 9/5153; A61K 35/76; A61K 47/42; A61K 48/00; A61K 9/0019; A61K 9/5146; A61P 13/12; A61P 9/12
See application file for complete search history.

(56) References Cited

FOREIGN PATENT DOCUMENTS

WO   WO/2007/112364   10/2007

OTHER PUBLICATIONS

Lee et al. Vascular endothelial growth factor-C and -D are involved in lymphangiogenesis in mouse unilateral ureteral obstruction. Kidney International (Jan. 2013), vol. 83, Issue 1, pp. 50-62 (Year: 2013).*
Balasubbramanian, D. et al. (2019) "Immune cell trafficking, lymphatics and hypertension," *British Journal of Pharmacology* 176(12), 1978-1988.
Abouelkheir, G. R. et al. (2017) "Lymphangiogenesis: fuel, smoke, or extinguisher of inflammation's fire?," *Experimental Biology and Medicine* 242(8), 884-895.
Alex, R. et al. (1990) "Encapsulation of water-soluble drugs by a modified solvent evaporation method. I. Effect of process and formulation variables on drug entrapment," *Journal of Microencapsulation* 7(3), 347-355.
Alexis, F. (2005) "Factors affecting the degradation and drug-release mechanism of poly(lactic acid) and poly [(lactic acid)-co-(glycolic acid)]," *Polymer International* 54(1), 36-46.
Ameller, T. et al. (2003) "Polyester-poly(ethylene glycol) nanoparticles loaded with the pure antiestrogen RU 58668: physicochemical and opsonization properties," *Pharmaceutical Research* 20(7), 1063-1070.
Ameller, T. et al. (2004) "Pure antiestrogen RU 58668-loaded nanospheres: morphology, cell activity and toxicity studies," *European Journal of Pharmaceutical Sciences* 21(2-3), 361-370.
Astete, C. E. et al. (2006) "Synthesis and characterization of PLGA nanoparticles," *Journal of Biomaterials Science, Polymer Edition* 17(3), 247-289.
Balasubbramanian, D. et al. (2020) "Kidney-specific lymphangiogenesis increases sodium excretion and lowers blood pressure in mice," *Journal of Hypertension* 38(5), 874-885.
Balasubbramanian, D. et al. (2019) "Augmenting Renal Lymphatic Density Prevents Angiotensin II-Induced Hypertension in Male and Female Mice," *American Journal of Hypertension* 33(1), 61-69.
Batista, C. A. et al. (2015) "Nonadditivity of nanoparticle interactions," *Science* 350(6257), Article No. 1242477.
Betzel, T. et al. (2013) "Radiosynthesis and preclinical evaluation of 3'-Aza-2'-[(18)F]fluorofolic acid: a novel PET radiotracer for folate receptor targeting," *Bioconjugate chemistry* 24(2), 205-214.
Bouchemal, K. et al. (2004) "Nano-emulsion formulation using spontaneous emulsification: solvent, oil and surfactant optimisation," *International Journal of Pharmaceutics* 280(1), 241-251.

(Continued)

Primary Examiner — Jeanette M Lieb
(74) Attorney, Agent, or Firm — Medlen & Carroll, LLP

(57) ABSTRACT

The present invention relates to a method for reducing blood pressure by stimulating lymphatic vessel growth and/or lymphangiogenesis in the kidneys.

16 Claims, 8 Drawing Sheets

(56) References Cited

OTHER PUBLICATIONS

Braam, B. et al. (2017) "Recognition and Management of Resistant Hypertension," *Clinical Journal of the American Society of Nephrology* 12(3), 524.

Cheng, J. et al. (2007) "Formulation of Functionalized PLGA-PEG Nanoparticles for In Vivo Targeted Drug Delivery," *Biomaterials* 28(5), 869-876.

Cooper, M. E et al. (1999) "Increased renal expression of vascular endothelial growth factor (VEGF) and its Receptor VEGFR-2 in experimental diabetes," *Diabetes* 48(11), 2229.

Csaba, N. et al. (2005) "PLGA:poloxamer and PLGA:poloxamine blend nanoparticles: new carriers for gene delivery," *Biomacromolecules* 6(1), 271-278.

Csaba, N. et al. (2004) "Design and characterisation of new nanoparticulate polymer blends for drug delivery," *Journal of Biomaterials Science, Polymer Edition* 15(9), 1137-1151.

Gashev, A. A. et al. (2002) "Inhibition of the active lymph pump by flow in rat mesenteric lymphatics and thoracic duct," *Journal of Physiology* 540(3), 1023-1037.

Goldman, J. et al. (2005) "Overexpression of VEGF-C causes transient lymphatic hyperplasia but not increased lymphangiogenesis in regenerating skin," *Circulation Research* 96(11), 1193-1199.

Govender, T. et al. (1999) "PLGA nanoparticles prepared by nanoprecipitation: drug loading and release studies of a water soluble drug," *Journal of Controlled Release* 57(2), 171-185.

Guzik, T. J. et al. (2007) "Role of the T cell in the genesis of angiotensin II-induced hypertension and vascular dysfunction," *Journal of Experimental Medicine* 204(10), 2449-2460.

Hasegawa, S. et al. (2017) "Vascular endothelial growth factor-C ameliorates renal interstitial fibrosis through lymphangiogenesis in mouse unilateral ureteral obstruction," *Laboratory Investigation* 97(12), 1439-1452.

Holmberg, K. et al. (2003) in *Surfactants and Polymers in Aqueous Solution* 2nd ed., p. 451, Wiley, Chichester.

Iwata, T. et al. (2008) "Lymphangiogenesis and Angiogenesis in Conventional Renal Cell Carcinoma: Association with Vascular Endothelial Growth Factors A to D Immunohistochemistry," *Urology* 71(4), 749-754.

Jones, D. et al. (2011) "An overview of lymphatic vessels and their emerging role in cardiovascular disease," *Journal of Cardiovascular Disease Research* 2(3), 141-152.

Kneedler, S. C. et al. (2017) "Renal inflammation and injury are associated with lymphangiogenesis in hypertension," *American Journal of Physiology—Renal Physiology* 312(5), F861-F869.

Landfester, K. (2003) "Miniemulsions for Nanoparticle Synthesis," *Topics in Current Genetics* 227, 75-123.

Liang, C. et al. (2011) "Improved therapeutic effect of folate-decorated PLGA-PEG nanoparticles for endometrial carcinoma," *Bioorganic & Medicinal Chemistry* 19(13), 4057-4066.

Lopez-Quintela, M. (2003) "Synthesis of nanomaterials in microemulsions: formation mechanisms and growth control," *Current Opinion in Colloid & Interface Science* 8, 137.

Lopez Gelston, C. A. et al. (2018) "Enhancing Renal Lymphatic Expansion Prevents Hypertension in Mice," *Circulation Research* 122(8), 1094-1101.

Miguel, C. D. et al. (2010) "T lymphocytes mediate hypertension and kidney damage in Dahl salt-sensitive rats," *American Journal of Physiology—Regulatory, Integrative and Comparative Physiology* 298(4), R1136-R1142.

Niwa, T. et al. (1993) "Preparations of biodegradable nanospheres of water-soluble and insoluble drugs with D,L-lactide/glycolide copolymer by a novel spontaneous emulsification solvent diffusion method, and the drug release behavior," *Journal of Controlled Release* 25(1), 89-98.

Niwa, T. et al. (1994) "In Vitro Drug Release Behavior of D, L-Lactide/Glycolide Copolymer (PLGA) Nanospheres with Nafarelin Acetate Prepared by a Novel Spontaneous Emulsification Solvent Diffusion Method," *Journal of Pharmaceutical Sciences* 83(5), 727-732.

Obeidat, W. M. et al. (2003) "Viscosity of polymer solution phase and other factors controlling the dissolution of Theophylline microspheres prepared by the emulsion solvent evaporation method," *Journal of Microencapsulation* 20(1), 57-65.

Oster, C. G. et al. (2004) "Design of amine-modified graft polyesters for effective gene delivery using DNA-loaded nanoparticles," *Pharmaceutical Research* 21(6), 927-931.

Palmer, B. F. et al. (2014) "Oxygen sensing and metabolic homeostasis," *Molecular and Cellular Endocrinology* 397(1), 51-58.

Panagi, Z. et al. (2001) "Effect of dose on the biodistribution and pharmacokinetics of PLGA and PLGA-mPEG nanoparticles," *International Journal of Pharmaceutics* 221(1), 143-152.

Park, S.-J. et al. (2004) "Preparation and characterization of biodegradable poly(1-lactide)/poly(ethylene glycol) microcapsules containing erythromycin by emulsion solvent evaporation technique," *Journal of Colloid and Interface Science* 271(2), 336-341.

Parker, N. et al. (2005) "Folate receptor expression in carcinomas and normal tissues determined by a quantitative radioligand binding assay," *Analytical Biochemistry* 338(2), 284-293.

Paul, B. K. et al. (2001) "Uses and applications of microemulsions," *Current Science* 80(8), 990-1001.

Prakobvaitayakit, M. et al. (2003) "Optimization of polylactic-co-glycolic acid nanoparticles containing itraconazole using 2(3) factorial design," *AAPS PharmSchiTech* 4(4), 565-573.

Rissanen, T. T. et al. (2003) "VEGF-D Is the Strongest Angiogenic and Lymphangiogenic Effector Among VEGFs Delivered Into Skeletal Muscle via Adenoviruses," *Circulation Research* 92(10), 1098-1106.

Sáinz, J. et al. (2004) "Role of sex, gonadectomy and sex hormones in the development of nitric oxide inhibition-induced hypertension," *Experimental Physiology* 89(2), 155-162.

Saxena, V. et al. (2004) "Indocyanine green-loaded biodegradable nanoparticles: preparation, physicochemical characterization and in vitro release," *International Journal of Pharmaceutics* 278(2), 293-301.

Selhub, J. et al. (1984) "The folate-binding protein of rat kidney. Purification, properties, and cellular distribution," *Journal of Biological Chemistry* 259(10), 6601-6606.

Senger, D. R. et al. (1983) "Tumor cells secrete a vascular permeability factor that promotes accumulation of ascites fluid," *Science* 219(4587), 983-985.

Skobe, M. et al. (2001) "Induction of tumor lymphangiogenesis by VEGF-C promotes breast cancer metastasis," *Nature Medicine* 7(2), 192-198.

Sommers, S. C. et al. (1958) "Histologic studies of kidney biopsy specimens from patients with hypertension," *American Journal of Pathology* 34(4), 685-715.

Su, J. L. et al. (2007) "The role of the VEGF-C/VEGFR-3 axis in cancer progression," *British Journal of Cancer* 96(4), 541-545.

Takada, S. et al. (2003) "Sustained release of human growth hormone from microcapsules prepared by a solvent evaporation technique," *Journal of Controlled Release* 88(2), 229-242.

Visuri, M. T. et al. (2015) "VEGF-C and VEGF-C156S in the pro-lymphangiogenic growth factor therapy of lymphedema: a large animal study," *Angiogenesis* 18(3), 313-326.

Whelton, P. K. et al. (2018) "2017 ACC/AHA/AAPA/ABC/ACPM/AGS/APhA/ASH/ASPC/NMA/PCNA Guideline for the Prevention, Detection, Evaluation, and Management of High Blood Pressure in Adults: A Report of the American College of Cardiology/American Heart Association Task Force on Clinical Practice Guidelines," *Hypertension* 71(6), e13-e115.

White, F. N. et al. (1964) "Autoimmune Factors Associated with Infarction of the Kidney," *Nephron* 1(2), 93-102.

Williams, R. M. et al. (2016) "Nanomedicines for kidney diseases," *Kidney International* 90(4), 740-745.

Williams, R. M. et al. (2015) "Mesoscale nanoparticles selectively target the renal proximal tubule epithelium," *Nano Letters* 15(4), 2358-2364.

Williams, R. M. et al. (2018) "Selective Nanoparticle Targeting of the Renal Tubules," *Hypertension* 71(1), 87-94.

Yang, G. H. et al. (2014) "Overexpression of VEGF-C attenuates chronic high salt intake-induced left ventricular maladaptive remod-

(56) References Cited

OTHER PUBLICATIONS eling in spontaneously hypertensive rats," *American Journal of Physiology Heart and Circulatory Physiology* 306(4), H598-609.
Yazdani, S. et al. (2014) "Lymphangiogenesis in renal diseases: passive bystander or active participant?," *Expert Reviews in Molecular Medicine* 16, e15.
Zeisberg, M. et al. (2015) "Physiology of the Renal Interstitium," *Clinical Journal of the American Society of Nephrology* 10(10), 1831.
Zhou, P. et al. (2014) "Kidney-targeted drug delivery systems," *Acta Pharmaceutica Sinica* B 4(1), 37-42.
PCT International Search Report of International Application No. PCT/US2019/050608 dated Nov. 25, 2019.

\* cited by examiner

*Expected Results.*

| | 3A HTN +KidVD- (all 3 models) | 3A HTN +KidVD+ +DOX early | 3A HTN +KidVD+ +DOX late | 3B HTN Immune Cells +KidVD- | 3B HTN Immune Cells +KidVD+ | 3C HTN +rVEGF-C c156s early | 3C HTN +rVEGF-C c156s late |
|---|---|---|---|---|---|---|---|
| Blood Pressure | ↑ | → | → | ↑ | → | → | → |
| Renal Lymphatic #s | ↑ | ⇈ | ⇈ | ↑ | ⇈ | ⇈ | ⇈ |
| Kidney Inflam/Uri Prot | ↑ | → | → | ↑ | → | → | → |
| Renal Immune Cells | ↑ | → | → | ↑ | → | → | → |

FIGURE 5

MODULATING RENAL LYMPHATICS TO REGULATE BLOOD PRESSURE

CROSS-REFERENCE TO RELATED APPLICATIONS

The present application claims the benefit of U.S. Provisional Patent Application No. 62/729,771, filed on Sep. 11, 2018, which is incorporated herein by reference.

FIELD OF THE INVENTION

The present invention relates to a method for reducing blood pressure.

BACKGROUND OF THE INVENTION

The number of people in the US with hypertension (HTN) is increasing and now almost 1 in 2 adults have the #1 contributor to cardiovascular-renal disease. Of these people, almost 50% of them have salt-sensitive hypertension (SSHTN). Patients with SSHTN are at a 3-fold higher risk for developing cardiovascular-renal disease such as coronary artery disease, stroke, or chronic kidney disease, and African-Americans are especially at risk since 75% of those with hypertension have SSHTN. Current anti-hypertensive medications used for HTN and SSHTN have numerous serious side effects, therefore there is a critical need for targeted therapies that can reduce the detrimental cardiovascular-renal effects of HTN and SSHTN.

SUMMARY OF THE INVENTION

The present invention relates to a method for reducing blood pressure. The described features, structures, or characteristics of the invention may be combined in any suitable manner in one or more embodiments. In the following description, numerous specific details are recited to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Other objects, advantages, and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

In one embodiment, the invention contemplates a method of treatment of a subject comprising: (a) providing a drug delivery vehicle comprising a carrier and a composition that stimulates lymphatic vessel growth, wherein said drug delivery vehicle delivers drug to the kidney; and (b) treating said subject by administering said drug delivery vehicle under conditions such that lymphatic vessel growth is stimulated in one or more of the kidneys of said subject. In one embodiment, the number of lymphatic vessels is increased in one or more of the kidneys of said subject. In one embodiment, the subject has a blood pressure and wherein said blood pressure is lower after step b). In one embodiment, said drug delivery vehicle delivers drug to the kidney with negligible delivery to the liver. In one embodiment, said drug delivery vehicle delivers at least ten times more drug to the kidney as drug delivered to the liver. In one embodiment, said drug delivery vehicle delivers at least twenty times more drug to the kidney as drug delivered to the liver. In one embodiment, said carrier comprises a nanoparticle. In one embodiment, said carrier comprises a protein. In one embodiment, said protein is lysozyme. In one embodiment, said subject has hypertension. In one embodiment, said hypertension comprises salt-sensitive hypertension. In one embodiment, said treating enhances renal lymphatic expansion. In one embodiment, said composition comprises VEGF-D. In one embodiment, said composition comprises VEGF-C. In one embodiment, said composition comprises VEGF-C with a c156s mutation. In one embodiment, said composition comprises a virus encoding at least one vascular endothelial growth factor. In one embodiment, said vascular endothelial growth factor is selected from the group consisting of VEGF-C, VEGF-D, or variants thereof.

In one embodiment, the invention contemplates a method of inducing renal lymphangiogenesis, comprising: (a) providing a drug delivery vehicle comprising a nanoparticle and composition comprising VEGF-C with a c156s mutation, wherein said drug delivery vehicle delivers said composition to the kidney; and (b) treating said subject by administering said drug delivery vehicle under conditions such that renal lymphangiogenesis is induced in one or more of the kidneys of said subject. In one embodiment, the number of lymphatic vessels is increased in one or more of the kidneys of said subject. In one embodiment, the subject has a blood pressure and wherein said blood pressure is lower after step b). In one embodiment, said drug delivery vehicle delivers drug to the kidney with negligible delivery to the liver. In one embodiment, said drug delivery vehicle delivers at least ten times more drug to the kidney as drug delivered to the liver. In one embodiment, said drug delivery vehicle delivers at least twenty times more drug to the kidney as drug delivered to the liver. In one embodiment, said subject has hypertension. In one embodiment, said hypertension comprises salt-sensitive hypertension. In one embodiment, said composition comprises a virus expressing said VEGF-C with a c156s mutation. In one embodiment, said composition comprises a vector expressing said VEGF-C with a c156s mutation.

In one embodiment, the invention contemplates a method of treatment of a subject with hypertension comprising: (a) providing: (i) at least one nanoparticle, wherein said nanoparticle is a kidney targeting nanoparticle, (ii) at least one composition that increases lymphatic vessel growth, wherein said composition is associated with said nanoparticle, and (b) treating said subject by administering said nanoparticle under conditions such that lymphatic vessel growth is stimulated in one or more of the kidneys of said subject and at least one symptom of hypertension is reduced. In one embodiment, said symptom comprises high blood pressure. In one embodiment, said hypertension comprises salt-sensitive hypertension. In one embodiment, said composition is encapsulated by said nanoparticle. In one embodiment, said treatment enhances renal lymphatic expansion. In one embodiment, said composition comprises VEGF-D. In one embodiment, said composition comprises VEGF-C. In one embodiment, said composition comprises VEGF-C with a c156s mutation. In one embodiment, said composition comprises a vector expressing at least one vascular endothelial growth factor. In one embodiment, said composition comprises a vector encoding at least one vascular endothelial growth factor. In one embodiment, said vascular endothelial growth factor VEGF-C, VEGF-D, or variants thereof In one embodiment, the invention contemplates a method of treatment of a subject with hypertension comprising: (a) providing: (i) at least one nanoparticle, wherein said nanoparticle is a kidney targeting nanoparticle, (ii) at least one compound that increases lymphatic vessel, wherein said composition is associated with said nanoparticle, and (b) treating said subject by administering said nanoparticle under conditions such that lymphatic vessel growth is stimulated in one or more of the kidneys of said subject and at least one symptom of hypertension is reduced. In one embodiment, said symptom comprises high blood pressure. In one embodiment, said hypertension comprises salt-sensitive hypertension. In one embodiment, said composition is encapsulated by said nanoparticle. In one embodiment, said treatment enhances renal lymphatic expansion. In one embodiment, said compound comprises VEGF-D. In one embodiment, said composition comprises VEGF-C. In one embodiment, said composition comprises VEGF-C with a c156s mutation. In one embodiment, said composition comprises a virus encoding at least one vascular endothelial growth factor. In one embodiment, said vascular endothelial growth factor VEGF-C, VEGF-D, or variants thereof.

In one embodiment, the invention contemplates a method of treatment of a subject with hypertension comprising: (a) providing: (i) at least one nanoparticle, (ii) at least one composition that increases lymphatic vessel growth, wherein said composition is associated with said nanoparticle, and (b) treating said subject with hypertension by delivering said at least one nanoparticle associated with said composition that increases lymphatic vessel growth preferentially to the kidney via said at least one nanoparticle. In one embodiment, said nanoparticle is a kidney targeting nanoparticle. In one embodiment, said hypertension comprises salt-sensitive hypertension. In one embodiment, said treatment enhances renal lymphatic expansion. In one embodiment, said composition comprises VEGF-D. In one embodiment, said composition comprises VEGF-C. In one embodiment, said composition comprises VEGF-c156s. In one embodiment, said composition comprises a virus encoding at least one vascular endothelial growth factor. In one embodiment, said vascular endothelial growth factor VEGF-C, VEGF-D, or variants thereof.

In one embodiment, the invention contemplates a method of treatment of a subject with hypertension comprising: (a) providing: (i) at least one nanoparticle, (ii) at least one compound that increases lymphatic vessel, wherein said compound is associated with said nanoparticle, and (b) treating said subject with hypertension by delivering said at least one compound to the kidney that increases lymphatic vessel growth preferentially to the kidney via said at least one nanoparticle. In one embodiment, said nanoparticle is a kidney targeting nanoparticle. In one embodiment, said hypertension comprises salt-sensitive hypertension. In one embodiment, said treatment enhances renal lymphatic expansion. In one embodiment, said compound comprises VEGF-D. In one embodiment, said composition comprises VEGF-C. In one embodiment, said composition comprises VEGF-c156s. In one embodiment, said composition comprises a virus encoding at least one vascular endothelial growth factor. In one embodiment, said vascular endothelial growth factor VEGF-C, VEGF-D, or variants thereof.

In one embodiment, the invention contemplates a method of treatment of a subject with hypertension comprising: (a) providing: (i) at least one nanoparticle, (ii) at least one composition that modulates lymphatic vessel growth exclusively primarily into the kidney, and (b) treating said subject with hypertension by delivering said at least one composition that modulates lymphatic vessel growth exclusively primarily into the kidney via said at least one nanoparticle. In one embodiment, said nanoparticle is a kidney-specific targeting nanoparticle. In one embodiment, said hypertension comprises salt-sensitive hypertension. In one embodiment, said treatment enhances renal lymphatic expansion. In one embodiment, said composition comprises VEGF-D. In one embodiment, said composition comprises VEGF-C. In one embodiment, said composition comprises VEGF-C156Sc156s. In one embodiment, said composition comprises a virus encoding at least one vascular endothelial growth factor. In one embodiment, said vascular endothelial growth factor VEGF-C, VEGF-D, or variants thereof.

In one embodiment, the invention contemplates a method of treatment of a subject with hypertension comprising: (a) providing: (i) at least one nanoparticle, (ii) at least one compound that modulates lymphatic vessel, and (b) treating said subject with hypertension by delivering said at least one compound specifically primarily to the kidney that modulates lymphatic vessel growth exclusively primarily into the kidney via said at least one nanoparticle. In one embodiment, said nanoparticle is a kidney-specific targeting nanoparticle. In one embodiment, said hypertension comprises salt-sensitive hypertension. In one embodiment, said treatment enhances renal lymphatic expansion. In one embodiment, said compound comprises VEGF-D. In one embodiment, said composition comprises VEGF-C. In one embodiment, said composition comprises VEGF-C156Sc156s. In one embodiment, said composition comprises a virus encoding at least one vascular endothelial growth factor. In one embodiment, said vascular endothelial growth factor VEGF-C, VEGF-D, or variants thereof.

DEFINITIONS

To facilitate the understanding of this invention, a number of terms are defined below. Terms defined herein have meanings as commonly understood by a person of ordinary skill in the areas relevant to the present invention. Terms such as "a", "an" and "the" are not intended to refer to only a singular entity, but include the general class of which a specific example may be used for illustration. The terminology herein is used to describe specific embodiments of the invention, but their usage does not delimit the invention, except as outlined in the claims.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

The term "Vascular endothelial growth factor (VEGF)," originally known as "vascular permeability factor (VPF)" [1], as used herein refers to a signal protein produced by cells that stimulates the formation of blood and lymphatic vessels. To be specific, VEGF is a sub-family of growth factors, the platelet-derived growth factor family of cystine-knot growth factors. They are important signaling proteins involved in both vasculogenesis (the de novo formation of the embryonic circulatory system), angiogenesis (the growth of blood vessels from pre-existing vasculature), and lymphangiogenesis (the growth of lymphatic vessels from pre-existing vasculature). It is part of the system that restores the oxygen supply to tissues when blood circulation is inadequate such as in hypoxic conditions [2]. Serum concentration of VEGF is high in bronchial asthma and diabetes mellitus [3]. VEGF's normal function is to create new blood and lymphatic vessels during embryonic development, new blood and lymphatic vessels after injury, muscle following exercise, and new vessels (collateral circulation) to bypass blocked vessels. VEGF includes the following types VEGF-A, VEGF-B, VEGF-C, VEGF-D, PIGF, and variations therein. In some embodiments, variants thereof comprises amino acid residue substitutions or mutations, such as VEGF-C with a c156s mutation.

The term "Vascular endothelial growth factor C" or (VEGF-C) as used herein refers to a protein that is a member of the platelet-derived growth factor/vascular endothelial growth factor (PDGF/VEGF) family. It is encoded in humans by the VEGFC gene. Human VEGF-D protein can activate both VEGFR-2 and VEGFR-3, however, murine VEGF-D binds specifically to the lymphangiogenic receptor VEGFR-3. At least one variation upon VEGFC is VEGF-C c156s [4]. Recombinant human VEGF-C c156s has the cysteine at amino acid location 156 changed to a serine. This mutation prevents its binding to VEGF Receptor 2 (VEGFR-2) and makes it bind specifically to the lymphangiogenic receptor VEGFR-3.

The term "VEGF-D" or "C-fos-induced growth factor" (FIGF) (or vascular endothelial growth factor D, VEGF-D) as used herein refers to a vascular endothelial growth factor that in humans is encoded by the FIGF gene.

By the term "negligible" is meant that an amount that is not much more than background, and more specifically less than 5% of the administered drug, and more preferably less than 4% of the administered drug, and still more preferably less than 3% of the administered drug, and still more preferably less than 2% of the administered drug, and most preferably less than 1% of the administered drug.

By the term "kidney-targeted drug delivery systems" is meant various systems which are able to deliver drugs to the kidneys. Such systems, including but not limited to macromolecular carriers, prodrugs, nanoparticles and liposomes. Some such systems are described by Zhou 2014 [5] and Williams 2018 [6] and 2015 [7].

By the term "kidney targeting nanoparticle" is meant a nanoscale polymeric structure, including large (350 to 500 nm diameter) with a surrounding interfacial layer with a means for targeting the kidney. The interfacial layer is an integral part of nanoscale matter, fundamentally affecting all of its properties. The interfacial layer typically consists of ions, inorganic and organic molecules. Organic molecules coating inorganic nanoparticles are known as stabilizers, capping and surface ligands, or passivating agents [8]. Some kidney specific nanoparticles are like those described by Zhou 2014 [5] and Williams 2018 [6] and 2015 [7].

By the term "biological targeting moiety" (BTM) is meant a compound which, after administration, is taken up selectively or localizes at a particular site of the mammalian body in vivo. Such sites may be implicated in a particular disease state or be indicative of how an organ or metabolic process is functioning.

By the phrase "in a form suitable for mammalian administration" is meant a composition which is sterile, pyrogen-free, lacks compounds which produce toxic or adverse effects, and is formulated at a biocompatible pH (approximately pH 4.0 to 10.5). Such compositions lack particulates which could risk causing emboli in vivo, and are formulated so that precipitation does not occur on contact with biological fluids (e.g. blood). Such compositions also contain only biologically compatible excipients, and are preferably isotonic.

"Preferentially" when used in context with targeting a drug to an organ such as the kidney means that more drug is delivered to the kidney than is delivered to any other organ in the body.

A "carrier" when used in the context of a drug delivery vehicle means something to which the drug is attached (covalently or non-covalently), encapsulated, or otherwise associated. Examples of carriers in this context are proteins and nanoparticles.

DESCRIPTION OF THE FIGURES

The accompanying figures, which are incorporated into and form a part of the specification, illustrate several embodiments of the present invention and, together with the description, serve to explain the principles of the invention. The figures are only for the purpose of illustrating a preferred embodiment of the invention and are not to be construed as limiting the invention.

FIG. 3A shows nanoparticle characteristics and FIG. 3B the size distribution characterization and transmission electron microscopy imaging of two nanoparticle embodiments. kidney targeting FIG. 4A&B shows nanoparticle biodistribution data described in the Examples.

FIG. 5 shows expected results from various treatments.

DESCRIPTON OF THE INVENTION

Figure 1:
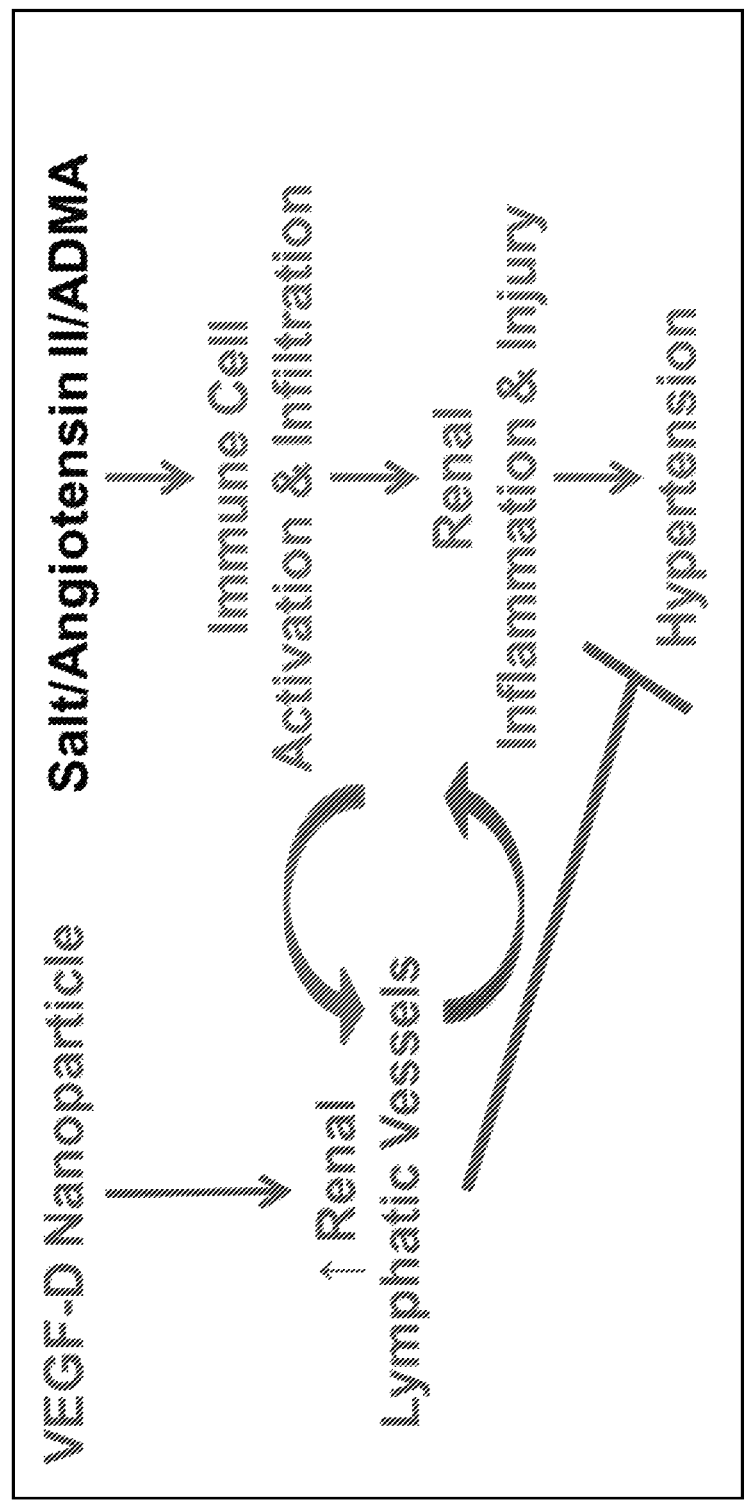
FIG. 1 shows renal lymphatics in hypertension (HTN). Pro-hypertensive stimuli (salt, angiotensin II, ADMA-asymmetric dimethylarginine) cause renal infiltration of activated immune cells, inflammation and interstitial injury, and HTN (red). Pro-hypertensive stimuli and inflammation also cause a compensatory increase in renal lymphatics in an effort to remove immune cells and resolve inflammation (blue). It is believed that further augmenting renal lymphatics with a kidney targeting nanoparticle delivering VEGF-D, or other pro-lymphangiogenic factor, will reduce renal injury and HTN.

The present invention relates to a method for the treatment of hypertension, including targeted therapies that can reduce the detrimental cardiovascular-renal effects of hypertension and salt-sensitive hypertension.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout the specification may, but do not necessarily, refer to the same embodiment.

Furthermore, the described features, advantages and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

Lymphatic vessels drain fluid, immune cells, and macromolecules from the space between arteries and veins within tissues of the body. Although not limiting the present invention, it is believed that increasing the number of lymphatic vessels preferentially in the kidney prior to stimuli that make animals develop high blood pressure, such as a high salt diet, prevents the development of kidney injury and high blood pressure. Although not limiting the present invention, it is believed that increasing renal lymphatics after hypertension is established can decrease blood pressure, supported by data. The implications would be to modulate lymphatic vessels in the kidney to help decrease blood pressure and reduce kidney injury in patients with hypertension. It is also possible that people with fewer amounts of kidney lymphatic vessels or who cannot make new ones appropriately are at higher risk of developing high blood pressure.

In one embodiment, the present invention comprises a nanoparticle that would deliver compounds that modulate lymphatic vessel growth to the kidney primarily. In one embodiment, the present invention also contemplates a high throughput screening of existing compounds that modulate (in particular increase) lymphatic vessel growth. In one embodiment, existing compounds that modulate lymphatic vessel growth are packaged in the kidney targeting delivery nanoparticle system. In one embodiment, the present invention further comprises an assay to determine who can grow new lymphatic vessels well or not might be able to screen for those people at risk of developing hypertension.

Almost 1 in 2 adults in the US have high blood pressure which places at them at a higher risk for developing a heart attack, stroke, or kidney failure. This new strategy to lower blood pressure would be enormous as the number of hypertensive patients wherein greater than 3 anti-hypertensive medications do not control blood pressure has increased markedly.

As described herein, the present invention contemplates the induction of lymphatic vessels preferentially in the kidney. In one embodiment, the present invention contemplates a kidney targeting delivery system of compounds that modulate lymphatic vessel growth as an example of where urinary biologics can be correlated to renal lymphatic density. In one embodiment, said system comprises at least one kidney specific nanoparticle, wherein compounds that modulate lymphatic vessel growth are associated with said nanoparticle.

Mice that are genetically engineered to make new lymphatic vessels preferentially in the kidney when they get a tetracycline class antibiotic in their drinking water do not develop several forms of hypertension when the new lymphatic vessels are made prior to or after starting the hypertensive stimuli, this both prevented the development of and treated hypertension. In these same mice, making them hypertensive and then genetically inducing the increase in renal lymphatics significantly decreased blood pressure Others have demonstrated that modulating lymphatic vessel growth by injecting compounds at the whole animal level can change blood pressure a little [9].

Urinary exosomes for signatures of lymphatic endothelium would be tested to correlate with vessel density in models.

Renal Nanoparticle Enhances Lymphatic Expansion and Reduces Hypertension

HTN and SSHTN in both humans and animals are characterized by activated immune cell infiltration into the kidney, interstitial inflammation and injury, and albuminuria. Others have reported that suppressing the immune system with mycophenolate mofetil reduces the number of immune cells that infiltrate the kidney and this prevents the development of HTN and SSHTN. These findings demonstrate the importance of activated immune cells in the kidney in HTN and SSHTN. However, it is not feasible to suppress the immune system of the ~148 million US adults with HTN and SSHTN. Instead of reducing the number of activated immune cells that enter the kidney, it is believed that improving immune cell trafficking out of the kidney will reduce renal inflammation and injury and HTN. In one embodiment, the present invention comprises a safe and effective therapeutic for HTN and SSHTN that targets renal lymphatic vessels. In one embodiment, said therapy comprises a nanoparticle that only targets the kidney, wherein a composition that enhances renal lymphatic expansion assoicated with said nanoparticle, and the result is an enhancement of renal lymphatic expansion in an effort to reduce kidney injury and HTN.

The resolution of chronic inflammation is believed to involve an increase in lymphatic vessels to extract interstitial immune cells and fluid. However, if the lymphatics do not respond appropriately, the result is accumulation of activated immune cells, propagation of inflammation, and tissue injury. It has been reported previously that renal lymphangiogenesis occurs in spontaneously hypertensive rats that develop renal injury but not in spontaneously hypertensive rats that are resistant to renal injury.

Figure 6:
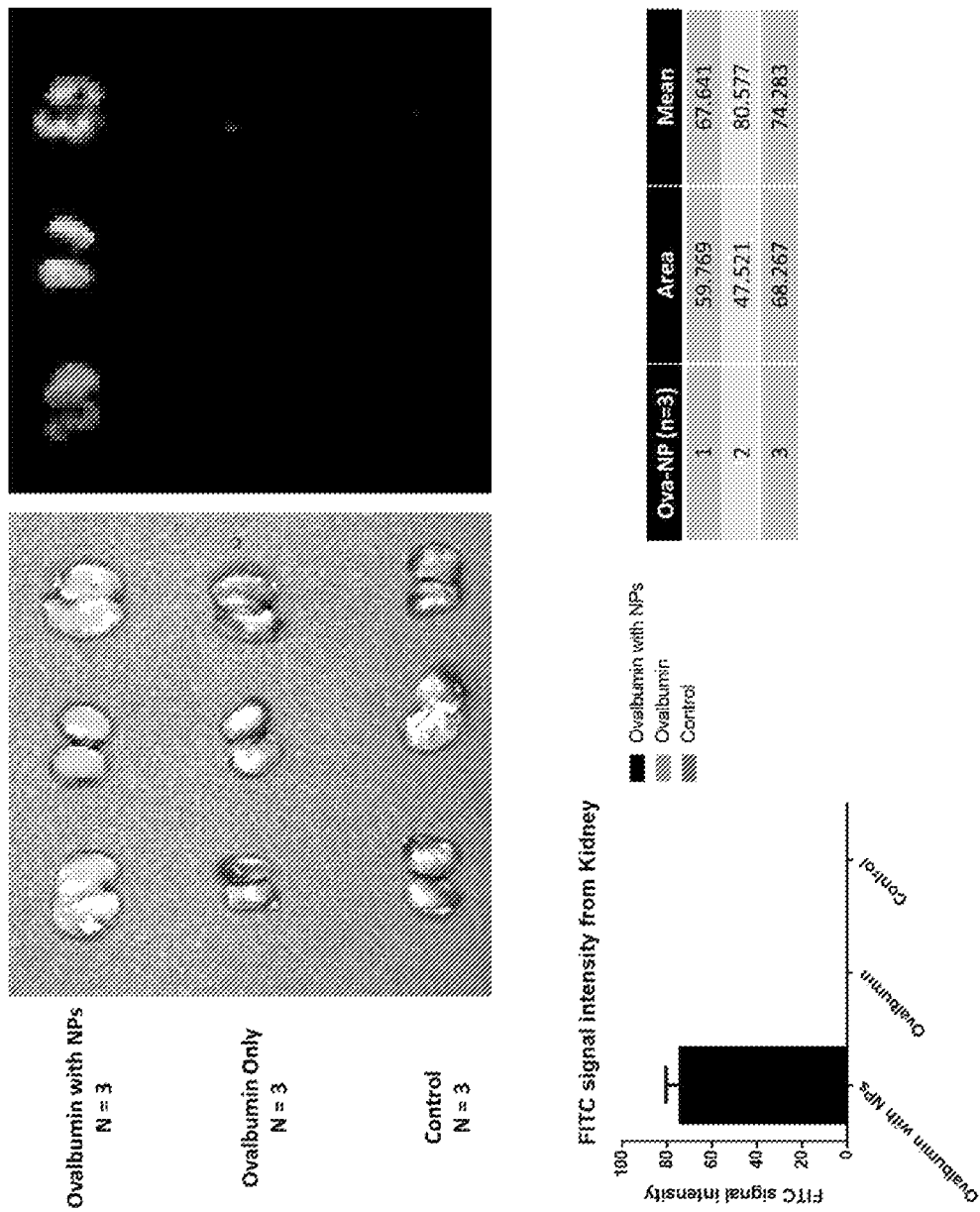
FIG. 6 shows fluorescence in kidneys of mice given an iv injection of NP1+FITC-ovalbumin, just FITC-ovalbumin (not nanoparticle encapsulated), or diluent alone. Images were taken using an IVIS imaging system 12 hours after injection. N=3 mice in each group. Quantification of FITC fluorescence intensity was performed using ImageJ.

Recent work demonstrates that in 3 different mouse models of HTN, renal lymphatics are increased, however there is still renal immune cell accumulation, inflammation, and injury. Inducing lymphangiogenesis further, preferentially in the kidneys, was able to both prevent the development of and treat all 3 forms of HTN [10]. In order to translate these important findings to humans, a safe and effective nanoparticle (FIG. 6) that delivers the pro-lymphangiogenic factor VEGF-D or VEGF-C c156s directly to the kidneys is contemplated where it will induce lymphangiogenesis and result in reduced inflammation and reduced blood pressure.

Figure 7:
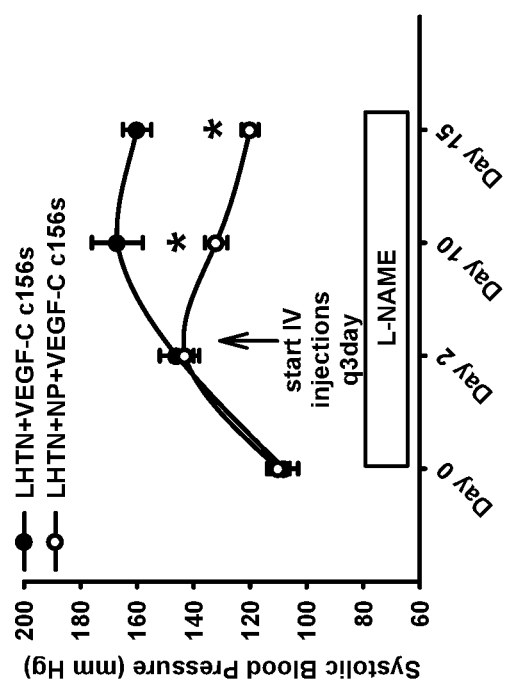
FIG. 7 exhibits systolic blood pressure measured on days 0, 2, 10, and 15. After baseline systolic blood pressure was taken the nitric oxide synthase inhibitor L-NAME was administered in the drinking water for 16 days. At day 2 when the mice were hypertensive, they began receiving iv injections of either VEGF-C c156s alone or VEGF-C c156s in the nanoparticle every 3 days. N=6 mice in the VEGF-C c156s group and N=5 in the NP+VEGF-C c156s group.
Figure 8:
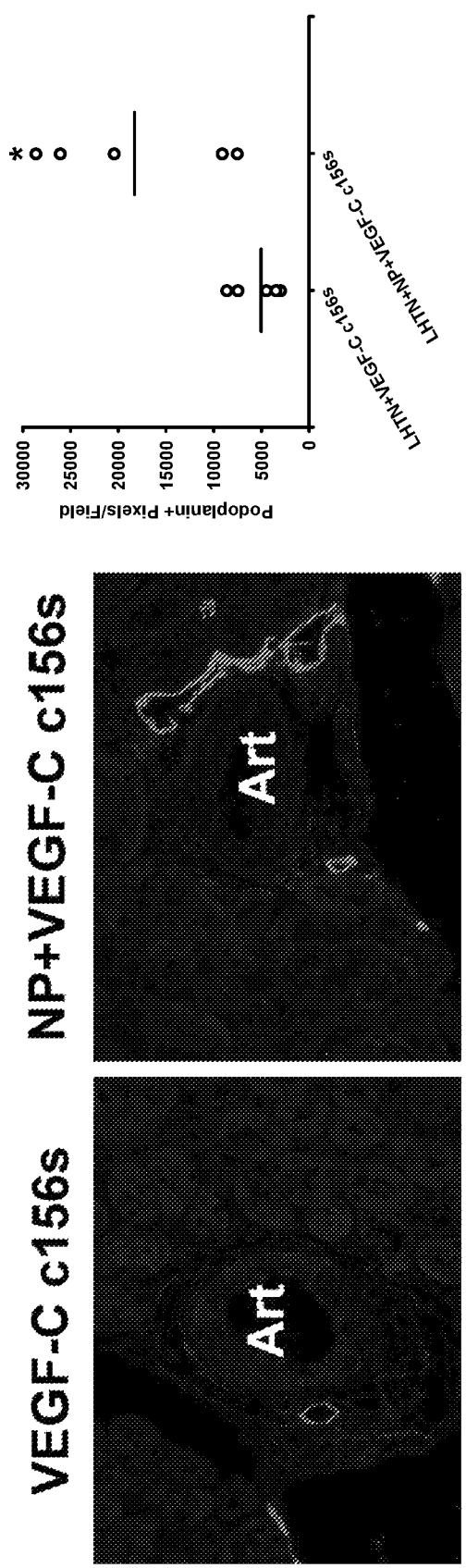
FIG. 8 shows staining of the lymphatic marker podoplanin in kidney sections from mice that received L-NAME drinking water and iv injections of either VEGF-C c156s alone or VEGF-C c156s in the nanoparticle every 3 days. Mice were euthanized and kidneys collected on day 16. Quantification of podoplanin fluorescence intensity was performed using ImageJ. N=6 mice in the VEGF-C c156s group and N=5 in the NP+VEGF-C c156s group.

Although not limiting the present invention to any particular mechanism, it is believed that nanoparticle-mediated delivery of VEGF-D or other pro-lymphangiogenic factor(s) preferentially to the kidneys will cause lymphangiogenesis and reduce all 3 forms of experimental HTN (FIG. 1). Preliminary data support this hypothesis as genetically augmenting lymphatics preferentially in the kidney prevents and treats renal inflammation and all forms of HTN. In one embodiment, the present invention contemplates a nanoparticle that will deliver VEGF-C c156s primarily to the kidney. Although not limiting the present invention to any particular mechanism, it is believed that a kidney targeting targeting nanoparticle will be able to deliver VEGF-C c156s directly and preferentially to the kidneys of mice. Although not limiting the present invention to any particular mechanism, it is believed nanoparticle-mediated delivery of VEGF-C c156s to the kidney will reduce hypertension (FIG. 7 and FIG. 8). In one embodiment, said nanoparticle-mediated delivery of VEGF-C c156s to the kidney will reduce salt-sensitive hypertension. Although not limiting the present invention to any particular mechanism, it is believed the results described herein will help elucidate a novel therapeutic for HTN and SSHTN in the form of a renal targeting nanoparticle capable of inducing lymphangiogenesis.

Although not limiting the present invention to any particular mechanism, it is believed the kidney's natural response to persistent interstitial inflammation and immune cell infiltration is to increase lymphatic density. Although not limiting the present invention to any particular mechanism, it is believed that providing more exit routes for immune cell exfiltration and preventing interstitial immune cell accumulation will be beneficial in HTN. Overexpression of VEGF-C through 4 weekly IV injections of a retrovirus into already hypertensive SHRs 8 weeks into a 12-week high-salt diet was able to increase cardiac lymphatic vessel numbers, reduce myocardial macrophage accumulation, and reduce SBP, however the renal lymphatics were not examined [11].

Figure 2:
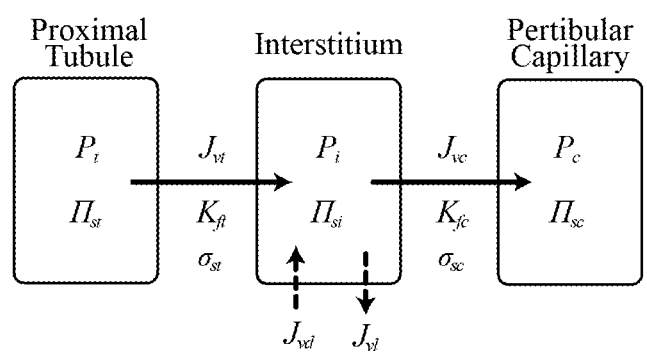
FIG. 2 shows a 3-compartment mathematical model of bulk fluid movement through the renal used to determined how increasing renal lymphatic flow (Jvl) affected interstitial pressure (Pi). The model takes into account various pressures, flow, and coefficients as well as solutes ($Na^+$, $Cl^+$, $K^+$, $HCO_3^-$, glucose, and protein).

Using a mathematical model of bulk fluid movement through the renal, it was determined how increasing renal lymphatic flow (Jvl) affected interstitial pressure (Pi). The 3-compartment model, shown in FIG. 2, takes into account various pressures, flow, and coefficients as well as solutes ($Na^+$, $Cl^+$, $K^+$, $HCO_3^-$, glucose, and protein). The model was run to determine how increasing renal lymphatic flow (Jvl) affected interstitial pressure (Pi). Doubling Jvl from 0.02 nL/min to 0.04 nL/min caused a 10% decrease in Pi which would greatly alter tubular reabsorption dynamics.

How does inducing renal lymphangiogenesis affect renal inflammation and HTN? Althought not limiting the present invention to any particular mechanism, it is believed that: (1) increasing the number of renal lymphatic vessels before and after HTN will prevent and treat HTN, respectively; (2) adoptive transfer of HTN immune cells will cause HTN in KidVD– mice but not in KidVD+ mice; and (3) kidney targeting nanoparticle delivery of VEGF-C c156s before and after HTN will increase the number of renal lymphatic vessels and prevent and treat HTN, respectively. In vivo studies will be performed using unique transgenic KidVD mice that conditionally augment lymphangiogenesis preferentially in the kidney as well as normal control mice. A kidney targeting nanoparticle that will deliver the lymphangiogenic signal VEGF-C c156s (VEGFR-3 specific) will also be developed and tested, see Example 1 and Example 2.

EXAMPLES

The following examples are provided in order to demonstrate and further illustrate certain preferred embodiments and aspects of the present invention and are not to be construed as limiting the scope thereof.

Example 1

Development of a Kidney Targeting Nanoparticle that Will Deliver rVEGF-C c156s.

Figure 3:
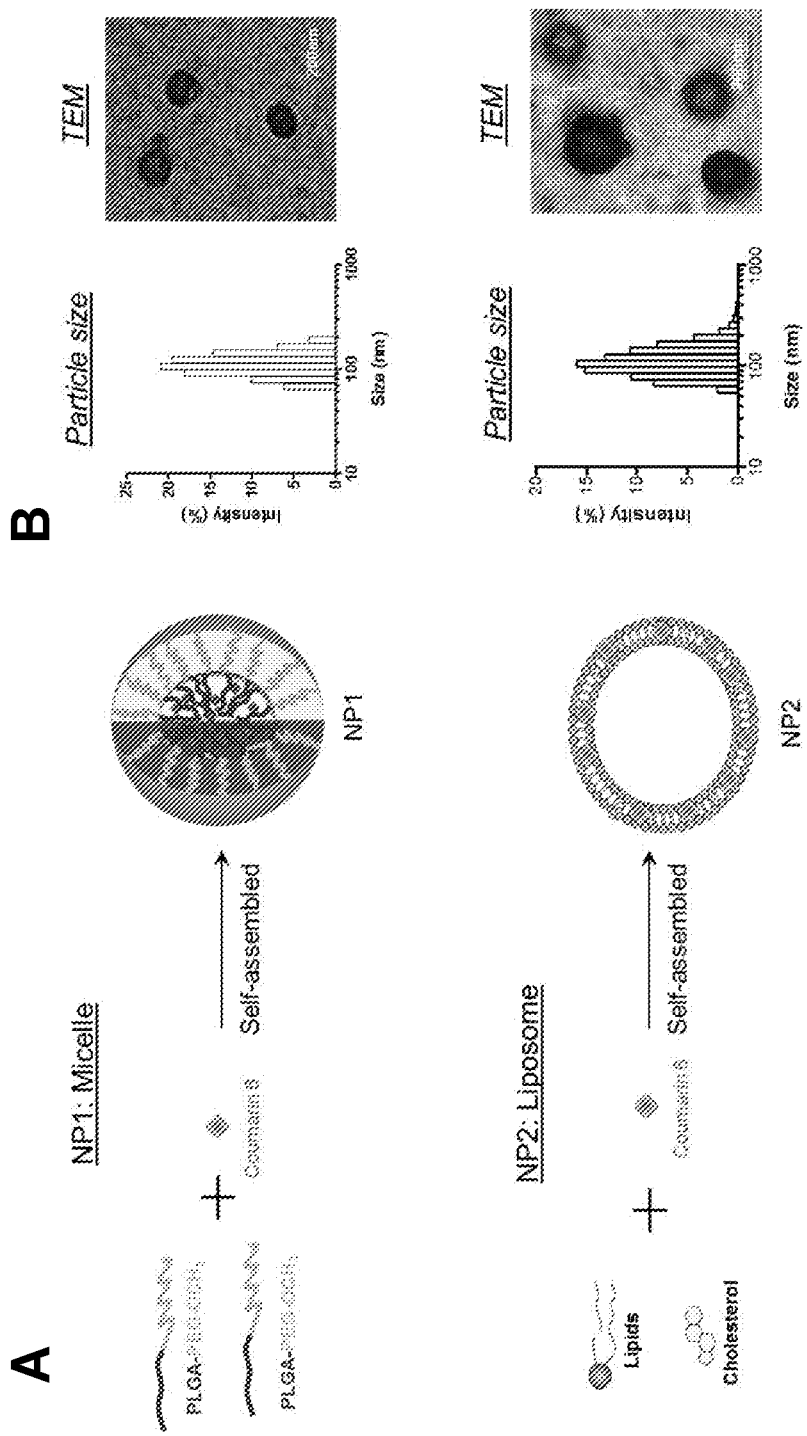
FIG. 3A&B shows nanoparticle details regarding the two embodiments of the nanoparticles described in the Examples.
Figure 4:
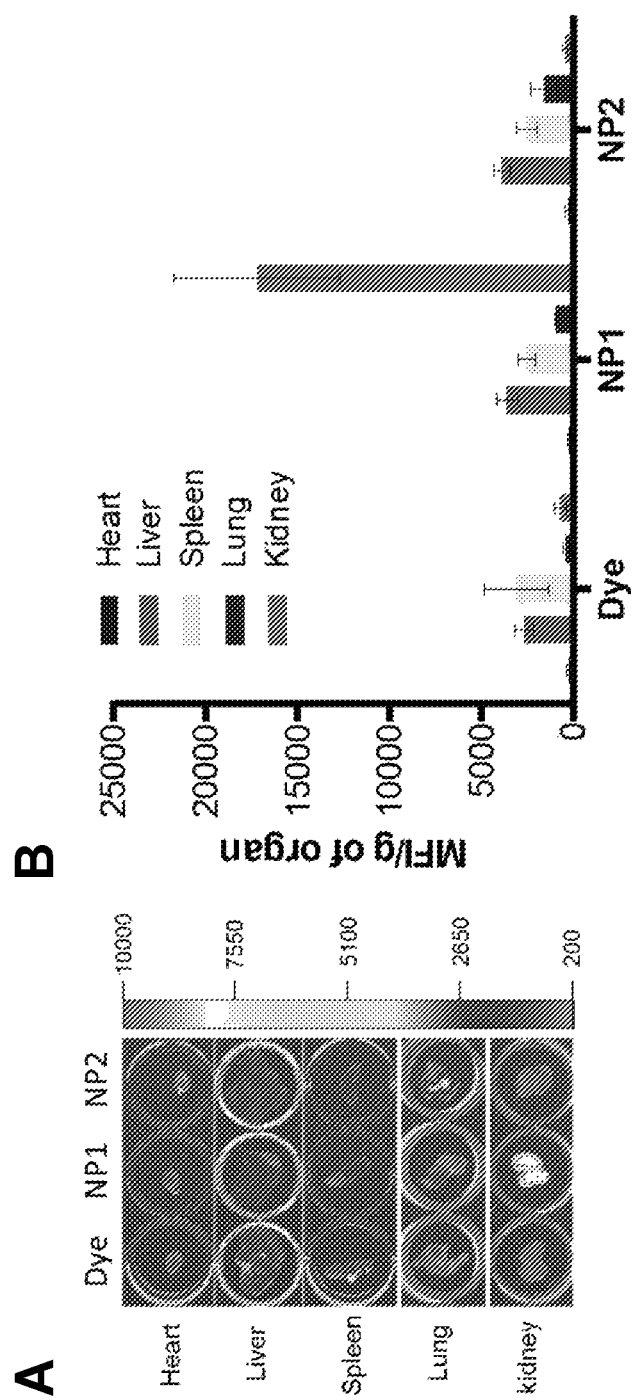
FIG. 4A&B shows the whole organ imaging and quantification of coumarin 6 fluorescence in each organ 12 hrs after iv injection of free coumarin 6 (Dye) or coumarin 6 encapsulated in kidney-targeting nanoparticle (NP1) or NP2 that fails to target the kidney. N=4 mice in each group.

A kidney targeting nanoparticle (NP1), comparable to one published previously [6], that initially has the fluorescent dye coumarin 6 (10%) encapsulated. Twelve hours after IV injection of 1 mg of nanoparticles into control C57B16 mice the organs were harvested and analyzed. Other mice were injected IV with the same amount of free coumarin 6 (Dye) or a negative control nanoparticle containing coumarin 6 (NP2). Nanoparticle details are presented in FIG. 3A&B and biodistribution data are presented in FIG. 4A&B.

Example 2

Inducing Renal Lymphangiogenesis via a Kidney Targeting Targeting rVEGF-C c156s Nanoparticle Before and After HTN will Prevent and Treat HTN, Respectively:

Wild-type VEGF-C can bind to both VEGFR-2 and VEGFR-3 and ligation of VEGFR-2 affects blood vasculature and ultimately blood pressure. However, the c156s mutation in VEGF-C makes the growth factor bind specifically to VEGFR-3 and not VEGFR-2. The specificity of rVEGF-C c156s for VEGFR-3 leads to lymphangiogenesis, however the desire is only to assess how kidney targeting lymphangiogenesis contributes to blood pressure regulation. Therefore, given the field's ability to primarily target nanoparticles directly to the kidney [6, 12], nanoparticles were implemented to encapsulate rVEGF-C c156s and deliver it to the kidney where it can induce lymphangiogenesis. To determine the effects that renal-specific lymphangiogenesis has on preventing HTN, one would begin therapy with the rVEGF-C c156s nanoparticle in mice prior to HTN. Since it takes ~7 days to grow new renal lymphatics, one would begin rVEGF-C c156s therapy 1 week prior to the initiation of the HTN stimuli and continue until euthanization of the mice. The same measures will be performed as previously described and the data will be compared to littermates that receive the NP2 negative control nanoparticle and HTN stimuli. Each group will consist of 8 males/8 females. Data are presented in FIG. 6, FIG. 7, and FIG. 8 to support these concepts.

To determine whether inducing renal lymphangiogenesis will improve immune cell trafficking out of the kidney and reduce blood pressure after HTN is established, one would induce renal lymphangiogenesis via rVEGF-C c156s nanoparticle therapy in mice after the initiation of HTN stimuli which would result in renal lymphangiogenesis after HTN is established. The same measures will be performed as previously described and the data will be compared to littermates that receive NP2 nanoparticle that fails to target the kidney as a control and HTN stimuli. Again, each group will consist of 8 males/8 females. FIG. 5 shows expected results from various treatments.

Example 3

Kidney Specific Nanoparticles

Large (350-400 nm) diameter polymer-based mesoscale nanoparticles (MNPs) localized 5 to 7 times more efficiently to the kidneys than any other organ on intravenous tail vein administration [7]. The localization appeared to be predominantly tubular in nature and persisted up to 7 days in the epithelial cells. These findings reveal a material in the nanotechnology, with potentially profound applications in renal disease [13].

Example 4

Particle Formulation and Characterization

MNPs were constructed from a diblock copolymer consisting of PLGA-PEG. MNPs were formed from poly(lactic-co-glycolic acid) conjugated to polyethylene glycol (PLGA-PEG). The block copolymer was conjugated as previously described [7]. Briefly, 5 g (90-130 μmol) carboxylic acid-terminated PLGA (50:50; molecular weight 28-54 kDa; Aldrich, St. Louis, Mo.) was dissolved in methylene chloride with 1.2 mmol N-hydroxysuccinimide and 1.2 mmol 1-ethyl-3-(3-(dimethylamino)propyl)-carbodiimide and stirred for ≈30 minutes. PLGA-N-hydroxysuccinimide was then precipitated with ethyl ether and washed with 50:50 ethyl ether:methanol and dried under vacuum. PLGA-N-hydroxysuccinimide (1 g, 18-26 μmol) was mixed with 50 μmol amine-PEG-carboxylic acid (molecular weight 5 kDa; Nanocs, New York, N.Y.) in chloroform and 220 μmol N,Ndiisopropylethylamine overnight. Conjugated PLGA-PEG was precipitated and washed with cold methanol then dried under vacuum. $^1H$ NMR was used to confirm conjugation as described by Cheng 2007 [14].

Example 5

Nanoprecipitation

The nanoprecipitation method was used to formulate MNPs encapsulating the compositions [15]. Typically, this method is used for hydrophobic drug entrapment, but it has been adapted for hydrophilic drugs as well. Polymer and drug are dissolved in a polar, water-miscible solvent such as acetone, acetonitrile, ethanol, or methanol. The solution is then poured in a controlled manner (i.e., drop-wise addition) into an aqueous solution with surfactant. Nanoparticles are formed instantaneously by rapid solvent diffusion. Finally, the solvent is removed under reduced pressure.

Important parameters to be considered are: polymer/surfactant ratio, polymer concentration, surfactant nature and concentration, solvent nature, viscosity, additives, active component and phase injection.

Polymer Concentration

The polymer concentration is maintained in the range of 1% (w/v) up to 10% (w/v). Prakobvaitayakit and Nimmannit [16] tested three different concentrations of 50:50 PLGA for nanosphere formation. The nanoparticle mean size was 190 nm for 1% (w/v) and the size increased to 238.9 nm for 10% (w/v). Govender et al. [17] used a concentration of 1% (w/v) to synthesize nanospheres of 157.1±1.9 nm in size. Csaba et al. [18] worked with a polymer concentration of 5% (w/v) to form nanoparticles with a size range from 161±7 nm to 269±11 nm. This size range is correlated to the presence of different polymers in the polymer blend used (detailed in the subsection on surfactants). Niwa et al. [19] worked with two different concentrations of 0.39% (w/v) and 0.44% (w/v) and the mean size was 195±34 nm and 283±37 nm, respectively. In another work, Niwa et al. [20] used 0.77% (w/v) PLGA-forming nanospheres with a mean size of 224±14 nm. Ameller et al. [21] worked with a concentration of 2% (w/v) and obtained nanospheres with a mean size of 260±50 nm, approx. 0.1% (w/w) poloxamer 188 was in the aqueous phase); a significant size reduction (approx. 80±20 nm for the same concentration) was achieved when PLGA was grafted to PEG (5 kDa) (no poloxamer in the aqueous phase), suggesting that the hydrophilic lattices provided by PEG stabilized the nanoparticles; the PLGA aggregation was reduced during nanosphere formation reducing the nanosphere mean size. The trend was maintained for two other polymers used, poly(D,L-lactide) (PLA) and poly(e-caprolactone) (PCL), which were covalently grafted with PEG (5 kDa).

Polymer Molecular Mass and Co-Polymer Ratio

The polymer molecular mass affects the size more significantly than the co-polymer ratio, as follows. Niwa et al. [19] worked with different molecular masses and copolymer ratios. The PLGA 50:50 with a molecular mass of 66.475 kDa formed nanospheres with a size of 338±67 nm, which was similar to the nanosphere size of 85:15 PLGA with a molecular mass of 66.671 kDa, measuring 385±51 nm in size. The 85:15 PLGA with a molecular mass of 127.598 kDa formed nanospheres with a mean size of 637±40 nm. These nanospheres were prepared with a mix of chloroform and acetone for the entrapment of indomethacin.

Solvent Nature

The selection of good solvents to form smaller nanoparticles and to improve the entrapment efficiency of the active component is a complex and an important process. There is no clear definition of the 'best solvent' for this method. Niwa et al. [19] used a mix of organic solvents (acetone, methanol, dichloromethane, or chloroform) to dissolve PLGA and drugs (indomethacin and 5-fluorouracil). The size of the 85:15 PLGA nanoparticles of two molecular masses (12.279 kDa and 66.671 kDa) changed when the mix of solvents was altered from 0.5: 5:5 ml to 0.5:25:5 ml (dichloromethane/ acetone/methanol). The first mix of solvents formed nanospheres with a mean size of 283±37 nm and 213±13 nm for the two molecular masses tested, and the second one formed nanospheres of 195±34 nm and 207±13 nm. The reduction in size with increased acetone concentration is attributed to the reduction in the surface tension of the dichloromethane solution in the presence of acetone. The formation process performed with dichloromethane or chloroform formed nanospheres 1 µm and larger in size.

Acetone is commonly used alone for the preparation of nanospheres. Ameller et al. [21, 22] obtained mean size nanoparticles of 258±97 nm with zeta potential of 53.4±0.5 mV. Prakobvaitayakit and Nimmannit [16] formed nanospheres with a mean size varying from 190 nm to 643.9 nm. Panagi et al. [23] formed nanospheres with mean size of 154±23.5 nm, PI of 0.489 and zeta potential of 45.1±1.9 mV with the same solvent. Oster et al. [24] obtained a mean size of 152±3 nm and zeta potential of 35±3 mV.

Saxena et al. [25] added methanol to acetonitrile (in which PLGA was dissolved) for a good dissolution of the active component. The mean size was 357±0.21 nm with a zeta potential of −16.3±1.5 mV. The higher zeta potential (less negative) is attributed to the presence of PVA over the nanosphere surface. Csaba et al. [18] worked with ethanol (organic phase) for the polymer nano-precipitation. The mean size of the nanospheres (PLGA 50:50) obtained was 191.5±7.1 nm. Other works used acetonitrile as the organic solvent. For example, Govender et al. [17] prepared nanospheres with a size of 157.1±1.9 nm with acetonitrile.

Surfactant

A variety of surfactants are used for nanoparticle formation and stabilization. The surfactant can be anionic, cationic or nonionic. Surfactants in the poloxamer and poloxamines family, formed with polyoxiyethylene and polyoxypropylene, are commonly used in nanoparticle synthesis. Surfactants of different HLB values can be obtained by varying the amount of monomers; less ethylene oxide monomers and more propylene oxide monomers form surfactants with lower HLB values. Csaba et al. [38] used poloxamer and poloxamines blended with PLGA in the organic phase. The samples formed with more hydrophobic surfactants (HLB of 1 and 2.5) had an increased final size of up to 333.7±82.1 nm for a PLGA/surfactant mass ratio of 50:75 mg/mg. The smaller size nanoparticle formed was 159.8±6.5 nm for the blend PLGA/Pluronic® F68 (HLB value 29) of 50:75 mg/mg. Pluronic® F68 has shorter ethylene oxide chains and larger propylene oxide chains compared with the other surfactants tested. Ameller et al. [34] used poloxamer 188 with a concentration of 0.1% (w/w) forming PLGA nanospheres of 262±52 nm mean size. The zeta potential obtained was −11 mV.

Another important surfactant used is PVA. Niwa et al. [19] tested different concentrations of PVA. The range tested was from 0.5% to 2% of PVA in the aqueous suspension, leading to nanoparticle formation with a mean size of 300 nm (no significant difference was detected in the range tested). Saxena et al. [25] obtained a mean nanoparticle size of 357±0.21 nm using 88-89% hydrolyzed PVA.

Additives

Certain compounds can improve the stability and size of the nanoparticles (fatty acids, short chains of carbons). Additionally, they can affect the entrapment efficiency of the active component. Govender et al. [17] found that fatty acid incorporation affected the entrapment efficiency of the active component (procaine hydrochloride and procaine dihydrate, water-soluble drugs) reducing the nanoparticles mean size. The authors added caprylic acid (molar ratio of 1:1 and 1:3), lauric acid (molar ratio of 1:1 and 1:3), PLA oligomers (molar ratio of 1:1) and poly(methyl methacrylate-co-methacrylic acid) (PMMA-MA) (molar ratio of 5: 1). Lauric acid in a molar ratio of 1:1 increased the drug content from 11% to 34.8% and the nanoparticle size was reduced from 157.1±1.9 nm to 118.8±1.4 nm ($P<0.05$). With the 3:1 molar ratio, the size was smaller (55.8±1.5 nm) but the morphology was altered (irregular shape). Zeta potential showed a slight increase from −49.2±0.7 mV to −44.1±1.8 mV. The longer carbon chain of lauric acid (in comparison to that of caprylic acid) was associated with the improvement in the nanoparticle characteristics.

Active Component Entrapment

Entrapment of active components has an important effect on the final nanospheres final size; as a general rule, entrapment of hydrophobic active components leads to formation of smaller nanospheres, as compared to the entrapment of hydrophilic components. The interaction between solvent, polymer and active component must be taken into account to improve the drug-loading and the drug-entrapment efficiency.

The entrapment of procaine hydrochloride (with a pH of 5.8 for aqueous solution) was found to increase the nanoparticle size from 157.1±1.9 nm to 209.5±2.7 nm for a theoretical drug loading of 0 to 10%, respectively. The drug content increased from 0.2 to 4.6% (w/w) when the theoretical drug loading was increased from 1 to 10% (w/w), but the entrapment efficiency decreased from 14.5 to 6.3% [17]. Although they reduced the nanosphere mean size by change of the aqueous pH (buffer pH 9.3), the size for PLGA alone was 123.6±2.3 nm and for nanospheres with 10% (w/w) theoretical drug loading, the size was 186.5±2.3 nm. In both cases, the entrapment formed bigger nanospheres in the presence of the drug, as compared with the PLGA alone. The nanospheres size was reduced with the entrapment of procaine dihydrate. When the theoretical drug loading of procaine dyhidrate was increased up to 10% (w/w), the mean size was reduced from 157±1.9 nm to 56.2±1.9 nm. The drug entrapment efficiency ranged from 36.2% up to 44.1% [17].

The entrapment of plasmids in PLGA nanoparticles increased the nanoparticle size, which can be observed in the work developed by Csaba et al. [18]. The organic solvent used to dissolve the polymer blends was methylene chloride and the polymer blends were PLGA/poloxamer and PLGA/poloxamine in a ratio of 50:50 mg/mg. Plasmid DNA encoding green fluorescent protein with CMV promoter (pEGFP-C1) in an aqueous solution was added to the organic phase. The mean size of naked PLGA nanospheres was 191±7 nm with a PI of 0.046 and zeta potential of −60.1±7.4 mV. When plasmid was added to the preparation with PLGA alone, the final size was 234±13 nm, PI 0.187 and zeta potential −72.7 mV. The addition of plasmid increased the size all samples tested, but the exception was for poloxamine Tetronic® 904 (HLB 14.5 and molecular mass 6.7 kDa). This sample showed a reduction of size from 168±9 nm to 161±7 nm, without and with plasmid, respectively. The zeta potential decreased from −38.4±3.3 mV to −54.1±2 mV for the same preparation and the PI was reduced from 0.179 to 0.154.

Saxena et al. [25] found that the retention of the ICG-NaI into the polymeric matrix was less than ICG because of the more hydrophilic nature of ICG-NaI. As a result of the lower retention of ICG-NaI, all further discussions will only consider ICG formulations. The mean nanoparticle size decreased with increasing concentration of ICG from 405±0.05 nm with 1% (w/w) of drug to 307±0.08 nm with 10% (w/w) of drug and the nanoparticle recovery was improved from 48 to 65.3%, respectively. The drug entrapment was reduced from 9.92 to 1.14% and the drug content decreased from 0.21 to 0.17% with increasing amounts of ICG (1-10%, w/w). When the drug/polymer ratio was reduced drastically to 0.125% (w/w), the drug entrapment increased to 74.47%. The drug content was 0.2% and the nanoparticle recovery was slightly decreased to 45.7% for the lower drug concentration.

Phase Injection

The organic phase addition to the continuous aqueous phase should be controlled and constant, by mild stirring, to assure a uniform distribution and diffusion. Prakobvaitayakit and Nimmannit [16] used a constant flow rate of 0.3 ml/min with mechanical stirring of 750 rpm. Govender et al. [17] reported a drop-wise organic phase addition. The stirring was done by a magnetic stirrer. The same procedure was followed by Saxena et al. [25]. Csaba et al. [18, 26] used vortex agitation for mixing both phases getting a fast organic phase dispersion and further moderate magnetic stirring. Other works using fast organic phase dispersion include those by Ameller et al. [21, 22]. Nanoprecipitation has the following advantages and disadvantages, as compared to other methods:

Advantages:

The use of non-highly-toxic solvents (i.e., acetone).

Reduced energy consumption because it only requires regular stirring.

The process does not require high stress shear (i.e., sonication or microfluidization).

Additives can be used for nanoparticle size reduction.

Disadvantages:

The solvent is removed by evaporation (time consuming).

The main drawback is the requirement for drugs to be highly soluble in polar solvents (i.e., acetone, ethyl acetate) and slightly soluble in water to minimize losses during solvent diffusion [27].

The drug loading efficiency is lower for hydrophilic drugs as compared to hydrophobic drugs because of their poor interaction (hydrophobic interaction) with the polymer leading to diffusion of the drug during the solvent displacement from the polymer in the organic phase to the external aqueous environment [28].

Nanoparticle size is very much affected by the polymer concentration; higher nanoparticle sizes are obtained at higher polymer concentrations.

Example 6

Emulsion Evaporation Method

Emulsion evaporation is the oldest method used to form polymeric nanoparticles from preformed polymers. The method is based on the emulsification of an organic solution of the polymer in an aqueous phase followed by the evaporation of the organic solvent. The polymer is dissolved in a suitable solvent (e.g., ethyl acetate, chloroform, methylene chloride). The organic phase or aqueous phase is poured into the continuous phase (aqueous or organic phase) in which a surfactant is dissolved to impart stability to the emulsion. Emulsification is carried out under high-shear stress to reduce the size of the emulsion droplet (directly related with the final size of the nanoparticles). The process of emulsification is followed by evaporation of the organic solvent under vacuum, which leads to polymer precipitation and nanoparticle formation.

Normal emulsions, oil in water (o/w) or water in oil (w/o) and double emulsions (w/o/w) can be used to accommodate the entrapment of active components with different properties. The o/w emulsion is used for entrapment of hydrophobic compounds, whereas w/o/w double emulsion is used for the entrapment of hydrophilic compounds. The method is widely used for microencapsulation because it is easy to scale-up, it does not require high shear stress and it can be adjusted (by use of the double-emulsion method) to encapsulate water-soluble drugs [29-32].

The formation of the emulsion is a key aspect of this method [33], considering that the size of the emulsion droplet is directly related to the final nanoparticle size. Emulsions can be classified in microemulsions, miniemulsions (or nanoemulsions) and macroemulsions. The microemulsions are transparent and thermodynamically-stable emulsions, with droplets mean sizes from 20 to 50 nm, obtained by conjugation of surfactant, solvent and co-surfactant. Microemulsions are thermodynamically stable due to the entropic effect of smaller droplets [34, 35]. The size of mini- or nanoemulsions is in the order of 40 to 500 nm [36, 37].

Thus, specific compositions and methods of modulating renal lymphatics to regulate blood pressure have been disclosed. It should be apparent, however, to those skilled in the art that many more modifications besides those already described are possible without departing from the inventive concepts herein. Moreover, in interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

Although the invention has been described with reference to these preferred embodiments, other embodiments can achieve the same results. Variations and modifications of the present invention will be obvious to those skilled in the art and it is intended to cover in the appended claims all such modifications and equivalents. The entire disclosures of all applications, patents, and publications cited above, and of the corresponding application are hereby incorporated by reference.

REFERENCES

1. Senger, D. R. et al. (1983) "Tumor Cells Secrete a Vascular Permeability Factor That Promotes Accumulation of Ascites Fluid," *Science* 219(4587), 983-985.
2. Palmer, B. F. and Clegg, D. J. (2014) "Oxygen Sensing and Metabolic Homeostasis," *Mol. Cell. Endocrinol.* 397 (1), 51-58.
3. Cooper, M. E. et al. (1999) "Increased Renal Expression of Vascular Endothelial Growth Factor (VEGF) and Its Receptor Vegfr-2 in Experimental Diabetes," *Diabetes* 48(11), 2229.
4. Visuri, M. T. et al. (2015) "VEGF-C and VEGF-C156s in the Pro-Lymphangiogenic Growth Factor Therapy of Lymphedema: A Large Animal Study," *Angiogenesis* 18(3), 313-326.
5. Zhou, P. et al. (2014) "Kidney-Targeted Drug Delivery Systems," *Acta Pharmaceutica Sinica B* 4(1), 37-42.
6. Williams, R. M. et al. (2018) "Selective Nanoparticle Targeting of the Renal Tubules," *Hypertension* 71(1), 87-94.

7. Williams, R. M. et al. (2015) "Mesoscale Nanoparticles Selectively Target the Renal Proximal Tubule Epithelium," *Nano Lett.* 15(4), 2358-2364.
8. Batista, C. A. et al. (2015) "Nonadditivity of Nanoparticle Interactions," *Science* 350(6257), 1242477.
9. Jones, D. and Min, W. (2011) "An Overview of Lymphatic Vessels and Their Emerging Role in Cardiovascular Disease," *Journal of Cardiovascular Disease Research* 2(3), 141-152.
10. Lopez Gelston, C. A. et al. (2018) "Enhancing Renal Lymphatic Expansion Prevents Hypertension in Mice," *Circ. Res.* 122(8), 1094-1101.
11. Yang, G. H. et al. (2014) "Overexpression of VEGF-C Attenuates Chronic High Salt Intake-Induced Left Ventricular Maladaptive Remodeling in Spontaneously Hypertensive Rats," *Am. J. Physiol. Heart. Circ. Physiol.* 306(4), H598-609.
12. Zhou, P. et al. (2014) "Kidney-Targeted Drug Delivery Systems," *Acta Pharmaceutica Sinica B* 4(1), 37-42.
13. Williams, R. M. et al. (2016) "Nanomedicines for Kidney Diseases," *Kidney Int.* 90(4), 740-745.
14. Cheng, J. et al. (2007) "Formulation of Functionalized Plga-PEG Nanoparticles for in Vivo Targeted Drug Delivery," *Biomaterials* 28(5), 869-876.
15. Astete, C. E. and Sabliov, C. M. (2006) "Synthesis and Characterization of Plga Nanoparticles," *J. Biomater. Sci., Polym. Ed.* 17(3), 247-289.
16. Prakobvaitayakit, M. and Nimmannit, U. (2003) "Optimization of Polylactic-Co-Glycolic Acid Nanoparticles Containing Itraconazole Using 2(3) Factorial Design," *AAPS PharmSciTech* 4(4), 565-573.
17. Govender, T. et al. (1999) "Plga Nanoparticles Prepared by Nanoprecipitation: Drug Loading and Release Studies of a Water Soluble Drug," *J. Control. Release* 57(2), 171-185.
18. Csaba, N. et al. (2005) "Plga:Poloxamer and Plga: Poloxamine Blend Nanoparticles: New Carriers for Gene Delivery," *Biomacromolecules* 6(1), 271-278.
19. Niwa, T. et al. (1993) "Preparations of Biodegradable Nanospheres of Water-Soluble and Insoluble Drugs with D,L-Lactide/Glycolide Copolymer by a Novel Spontaneous Emulsification Solvent Diffusion Method, and the Drug Release Behavior," *J. Control. Release* 25(1), 89-98.
20. Niwa, T. et al. (1994) "In Vitro Drug Release Behavior of D, L-Lactide/Glycolide Copolymer (Plga) Nanospheres with Nafarelin Acetate Prepared by a Novel Spontaneous Emulsification Solvent Diffusion Method," *J. Pharm. Sci.* 83(5), 727-732.
21. Ameller, T. et al. (2004) "Pure Antiestrogen Ru 58668-Loaded Nanospheres: Morphology, Cell Activity and Toxicity Studies," *Eur. J. Pharm. Sci.* 21(2-3), 361-370.
22. Ameller, T. et al. (2003) "Polyester-Poly(Ethylene Glycol) Nanoparticles Loaded with the Pure Antiestrogen Ru 58668: Physicochemical and Opsonization Properties," *Pharm. Res.* 20(7), 1063-1070.
23. Panagi, Z. et al. (2001) "Effect of Dose on the Biodistribution and Pharmacokinetics of Plga and Plga-Mpeg Nanoparticles," *Int. J. Pharm.* 221(1), 143-152.
24. Oster, C. G. et al. (2004) "Design of Amine-Modified Graft Polyesters for Effective Gene Delivery Using DNA-Loaded Nanoparticles," *Pharm. Res.* 21(6), 927-931.
25. Saxena, V. et al. (2004) "Indocyanine Green-Loaded Biodegradable Nanoparticles: Preparation, Physicochemical Characterization and in vitro Release," *Int. J. Pharm.* 278(2), 293-301.
26. Csaba, N. et al. (2004) "Design and Characterisation of New Nanoparticulate Polymer Blends for Drug Delivery," *J. Biomater. Sci., Polym. Ed.* 15(9), 1137-1151.
27. Jaeghere, F. D. et al. (1999) in *Encyclopedia of Control Drug Delivery* (Mathiowitz, E., Ed.), p 641, Wiley, New York, N.Y.
28. Alexis, F. (2005) "Factors Affecting the Degradation and Drug-Release Mechanism of Poly(Lactic Acid) and Poly [(Lactic Acid)-Co-(Glycolic Acid)]," *Polym. Int.* 54(1), 36-46.
29. Alex, R. and Bodmeier, R. (1990) "Encapsulation of Water-Soluble Drugs by a Modified Solvent Evaporation Method. I. Effect of Process and Formulation Variables on Drug Entrapment," *J. Microencapsul.* 7(3), 347-355.
30. Obeidat, W. M. and Price, J. C. (2003) "Viscosity of Polymer Solution Phase and Other Factors Controlling the Dissolution of Theophylline Microspheres Prepared by the Emulsion Solvent Evaporation Method," *J. Microencapsul.* 20(1), 57-65.
31. Takada, S. et al. (2003) "Sustained Release of Human Growth Hormone from Microcapsules Prepared by a Solvent Evaporation Technique," *J. Control. Release* 88(2), 229-242.
32. Park, S.-J. and Kim, S.-H. (2004) "Preparation and Characterization of Biodegradable Poly(L-Lactide)/Poly (Ethylene Glycol) Microcapsules Containing Erythromycin by Emulsion Solvent Evaporation Technique," *J. Colloid Interface Sci.* 271(2), 336-341.
33. Holmberg, K. et al. (2003) in *Surfactants and Polymers in Aqueous Solution* 2nd ed., p 451, Wiley, Chichester.
34. Lopez-Quintela, M. (2003) "Synthesis of Nanomaterials in Microemulsions: Formation Mechanisms and Growth Control," *Curr. Opin. Colloid Interface Sci.* 8, 137.
35. Paul, B. K. and Moulik, S. P. (2001) "Uses and Applications of Microemulsions," *Curr. Sci.* 80(8), 990-1001.
36. Landfester, K. (2003) "Miniemulsions for Nanoparticle Synthesis," *Top. Curr. Genet.* 227, 75-123.
37. Bouchemal, K. et al. (2004) "Nano-Emulsion Formulation Using Spontaneous Emulsification: Solvent, Oil and Surfactant Optimisation," *Int. J. Pharm.* 280(1), 241-251.

We claim:

1. A method of inducing renal lymphangiogenesis, comprising:
    (a) providing a drug delivery vehicle comprising a renal targeting mesoscale nanoparticle encapsulating VEGF-C with a c156s mutation, wherein said drug delivery vehicle delivers said composition to the kidney; and (b) treating said subject by administering said drug delivery vehicle under conditions such that renal lymphangiogenesis is induced in one or more of the kidneys of said subject, wherein the subject has high blood pressure and wherein said blood pressure is lower after step b).

2. The method of claim 1, wherein the number of lymphatic vessels is increased in one or more of the kidneys of said subject.

3. The method of claim 1, wherein said drug delivery vehicle delivers the drug to the kidney with negligible less than 5% drug delivery to the liver.

4. The method of claim 1, wherein said drug delivery vehicle delivers at least ten times more drug to the kidney as drug delivered to the liver.

5. The method of claim 1, wherein said drug delivery vehicle delivers at least twenty times more drug to the kidney as drug delivered to the liver.

6. The method of claim 1, wherein said hypertension comprises salt-sensitive hypertension.

7. The method of claim 1, wherein said composition comprises a virus expressing said VEGF-C with a c156s mutation.

8. The method of claim 1, wherein said composition comprises a vector expressing said VEGF-C with a c156s mutation.

9. A method of lowering blood pressure, comprising: (a) providing a drug delivery vehicle comprising a renal targeting mesoscale nanoparticle encapsulating VEGF-C with ac156s mutation, wherein said drug delivery vehicle delivers said composition to the kidney; and (b) treating said subject by administering said drug delivery vehicle under conditions such that renal lymphangiogenesis is induced in one or more of the kidneys of said subject, wherein said subject has hypertension, wherein the blood pressure is lower after step b).

10. The method of claim 9, wherein said hypertension comprises salt-sensitive hypertension.

11. The method of claim 9, wherein the number of lymphatic vessels is increased in one or more of the kidneys of said subject.

12. The method of claim 9, wherein said drug delivery vehicle delivers the drug to the kidney with less than 5% drug delivery to the liver.

13. The method of claim 9, wherein said drug delivery vehicle delivers at least ten times more drug to the kidney as drug delivered to the liver.

14. The method of claim 9, wherein said drug delivery vehicle delivers at least twenty times more drug to the kidney as drug delivered to the liver.

15. The method of claim 9, wherein said composition comprises a virus expressing said VEGF-C with a c156s mutation.

16. The method of claim 9, wherein said composition comprises a vector expressing said VEGF-C with a c156s mutation.

* * * * *